United States Patent [19]

Duncan

[11] Patent Number: 4,587,613
[45] Date of Patent: May 6, 1986

[54] MICROPROCESSOR CONTROL SYSTEM WITH A BIT/BYTE MEMORY ARRAY

[75] Inventor: Kenneth R. Duncan, Minnetonka, Minn.

[73] Assignee: Solid Controls, Inc., Minneapolis, Minn.

[21] Appl. No.: 704,080

[22] Filed: Feb. 21, 1985

[51] Int. Cl.⁴ .......................... G06F 9/22; G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,500,466 | 3/1970 | Carleton | 364/200 |
| 3,800,289 | 3/1974 | Batcher | 364/200 |
| 4,078,259 | 3/1978 | Soulsby et al. | 364/900 |
| 4,107,785 | 8/1978 | Seipp | 364/900 |
| 4,455,622 | 1/1984 | Loskorn et al. | 364/900 |

*Primary Examiner*—Harvey E. Springborn
*Attorney, Agent, or Firm*—Mason, Kolehmainen, Rathburn & Wyss

[57] ABSTRACT

A microprocessor control system includes a bit/byte memory array to enhance the performance characteristics of a microprocessor. The bit/byte memory array selectively allows the microprocessor to manipulate individual bits in the memory thereby reducing both execution time and program size. In addition, the bit/byte memory array allows the microprocessor to address data bytes in the memory array to quickly enable the transferring of large amounts of data.

8 Claims, 1 Drawing Figure

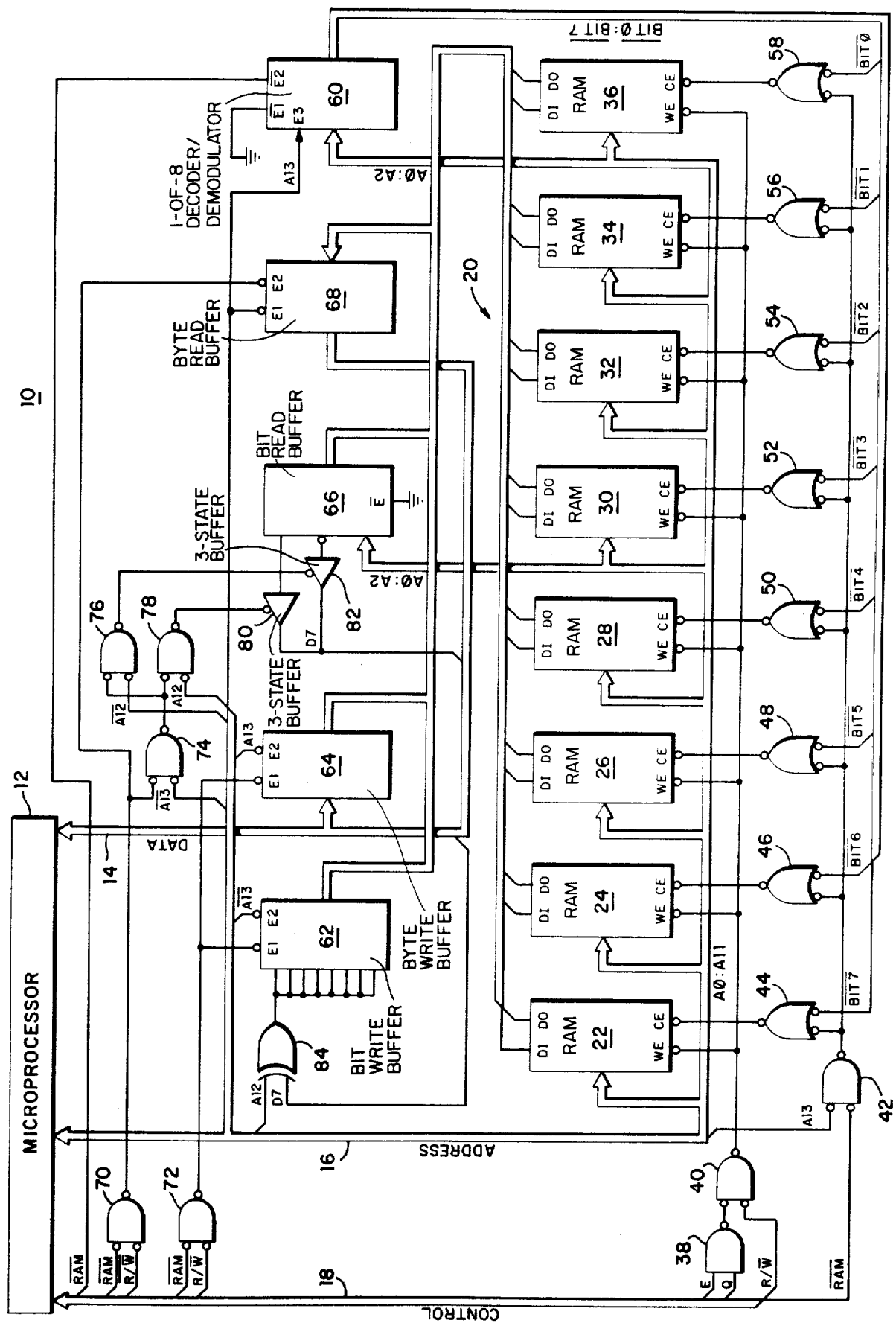

MICROPROCESSOR CONTROL SYSTEM WITH A BIT/BYTE MEMORY ARRAY

BACKGROUND OF THE INVENTION

This invention relates generally to microprocessor control systems, and more particularly, to a microprocessor control system including a bit/byte memory array.

Many microprocessor control systems are known in the art. In any microprocessor control system, it is highly desirable to minimize the execution time for a particular application program. Accordingly, it is highly desirable to minimize the number of instructions required for the particular application program.

Prior art microprocessor control systems utilize a subroutine including many bit/shift and rotate instructions that are required to move the operand bit in the microprocessing unit when solving one-bit wide Boolean logic expressions. Such subroutines increase the program size and likewise increase the execution time for the application program.

SUMMARY OF THE INVENTION

Accordingly, an object of the present invention is to provide an improved microprocessor control system.

Another object of the present invention is to provide a new and improved microprocessor control system having an external memory array to enable the microprocessor to selectively manipulate bytes or individual bits of data whereby both execution time and program size are reduced.

Briefly, the present invention relates to a microprocessor control system having a bit/byte memory array to enhance the performance characteristics of a microprocessor. The microprocessor control system includes an external memory array having a plurality of uniquely addressable memory devices, each of the memory devices having a plurality of directly addressable data storage locations. Control signals are provided for selecting and synchronizing the external memory array to the microprocessor and for controlling the transfer of data between the memory array and the microprocessor. Addressing signals are provided for selecting a desired one of the uniquely addressable memory devices and for selecting a predetermined addressable data storage location. The addressing signals identify a bit or byte data mode whereby the microprocessor is enabled to selectively manipulate data bytes or individual data bits. A feature of the present invention is that inverted data or true data is selectively provided for the bit data mode.

BRIEF DESCRIPTION OF THE DRAWING

The above and other objects and advantages and novel features of the present invention will become apparent from the following detailed description of the preferred embodiment of a microprocessor control system illustrated in the accompanying drawing:

The drawing is a partly schematic, block diagram illustrating the microprocessor control system of the invention.

DESCRIPTION OF THE PREFERRED EMBODIMENT

Referring to the drawing, there is illustrated a microprocessor control system designated generally by the reference character 10. The microprocessor control system 10 includes a microprocessor 12. The microprocessor 12 may be, for example, an 8-bit data, 16-bit address microprocessor, such as an Motorola 6809 microprocessor, although a variety of commercially available microprocessors having standard capabilities could be used. A bidirectional data bus 14, an address bus 16 and a control bus 18 enable bidirectional communication with an external storage or memory array 20. The external memory array 20 provides addressable memory locations for read and write operations. The external memory 20 includes random access memories (RAM) 22, 24, 26, 28, 30, 32, 34, 36. A 512×1 RAM may be utilized for each of the random access memories 22, 24, 26, 28, 30, 32, 34, 36. Each of the RAM's 22, 24, 26, 28, 30, 32, 34, 36 includes address inputs (A0–A8), a write enable (WE) input, a chip enable (CE) input, a data input (DI) and a data output (DO), as shown.

The microprocessor 12 provides a control signal ($\overline{\text{RAM}}$) to select the external memory array 20. The external memory array 20 is synchronized to the microprocessor 12 by microprocessor synchronization control signals (E and Q). A data transfer between the microprocessor 12 and the external memory array 20 is controlled by a read/write (R/$\overline{\text{W}}$) microprocessor control signal. The R/$\overline{\text{W}}$ control signal may be provided LOW for the write mode or during data transfer from the microprocessor 12 to the memory array 20 and may be provided HIGH for the read mode or during the opposite direction data transfer.

The write enable input signal is provided by the microprocessor 12 via a gating circuit that includes NAND gate 38 and a dual inverted-input NAND gate 40. The control signals E and Q are applied to different inputs of NAND gate 38 from the microprocessor 12 via the control bus 18. The output of the NAND gate 38 is applied to an input of the dual inverted-input NAND gate 40. The (R/$\overline{\text{W}}$) control signal from the microprocessor 12 is applied via the control bus 18 to the other input of the dual inverted-input NAND gate 40. The output of the dual inverted-input NAND gate 40 is applied to the WE input of each of the RAM's 22, 24, 26, 28, 30, 32, 34, 36.

The chip enable input signal is provided by the microprocessor 12 via a gating circuit including dual inverted-input NAND gate 42 and dual inverted-input NOR gates 44, 46, 48, 50, 52, 54, 56, 58. The microprocessor 12 provides the control signal $\overline{\text{RAM}}$ via the control bus 18 that is applied to an input of the dual inverted-input NAND gate 42. An address signal, for example, address bit A13 is provided by the microprocessor 12 via the address bus 16 and is applied to the other input of the dual inverted-input NAND 42. The output of the dual inverted-NAND 42 is applied to an input of each of the dual inverted-input NOR gates 44, 46, 48, 50, 52, 54, 56, 58.

A one-of-eight decoder/demodulator device 60 is utilized to enable a selected one of the RAM devices 22, 24, 26, 28, 30, 32, 34, 36. The one-of-eight decoder 60 may be provided by utilizing, for example, an integrated circuit device sold by Motorola, Inc. under the part number SN74LS138 and described in a publication entitled "Motorola Schottky TTL Data Book", copyrighted 1981. The decoder 60 includes 3 enable inputs, 2 active low inputs ($\overline{\text{E1}}$, $\overline{\text{E2}}$) and one active high input (E3). The active low $\overline{\text{E1}}$ input is not used for control and is connected to ground. The control signal $\overline{\text{RAM}}$ is applied to the active low $\overline{\text{E2}}$ input from the microprocessor 12 via the control bus 18. A bit/byte mode control address bit, for example, A13 is applied to the active high E3 input of the decoder device 60. The outputs $\overline{Bit0:Bit7}$ will be HIGH unless the $\overline{RAM}$ control signal is LOW and the A13 address bit is HIGH. The decoder device 60 accepts 3 binary weighted address inputs A0:A2 and when enabled provides eight mutually exclusive active LOW outputs $\overline{Bit0:Bit7}$ For the bit mode of operation, the address bit A13 is HIGH and the $\overline{RAM}$ signal is LOW so that the decoder device 60 is enabled. The decoder device 60 provides one of eight mutually exclusive active LOW outputs $\overline{Bit0:Bit7}$ corresponding to the address bits A0:A2 that are provided by the microprocessor 12. The outputs $\overline{Bit0:Bit7}$ are applied to the second input of the dual inverted-input NOR gates 44–58. The output of each of gates 44, 46, 48, 50, 52, 54, 56, 58 is applied to the CE input of each of the RAM devices 22, 24, 26, 28, 30, 32, 34, 36, respectively, so that a selected one of RAM devices 22, 24, 26, 28, 30, 32, 34, 36 is enabled according to the address bits A0:A2.

A bit write buffer 62, such as an integrated circuit device sold by Motorola, Inc. under the part number SN74LS541 and described in the Motorola Schottky TTL Data Book as an octal buffer/line driver with 3-state outputs is employed as a memory data driver for the bit mode of operation of the control system 10. The bit write buffer 62 is coupled to the data bus 14 to receive data bit D7 from the microprocessor 12. The bit write buffer 62 includes two enable inputs E1, E2. The $\overline{A13}$ address bit is applied to the E2 enable input. The output of the bit write buffer 62 correspond to the input data bit D7 when a LOW signal is applied to both E1, E2 enable inputs.

A byte write buffer 64 is employed as a memory data driver for the byte mode of operation of the control system 10. The byte write buffer 64 may be, for example, the same type of octal buffer, a 74LS541, as is employed for the bit write buffer 62. The byte write buffer 64 interfaces with the data bus 14 to receive data bits D0:D7 from the microprocessor 12 via the data bus 14. The A13 address bit is applied to the E2 enable input of the byte write buffer 64.

A bit read buffer 66 is employed to interface the external memory array 20 with the microprocessor 12 for the bit read mode of operation. The bit read buffer 66 may be, for example, an integrated circuit device sold by Motorola, Inc. under the part number SN74LS151 and described in the Motorola Schottky TTL Data Book as an 8-input digital multiplexer. The bit read buffer 66 includes an active low enable input $\overline{E}$ that is connected to ground so that the bit read buffer 66 is continuously enabled. The bit read buffer 66 provides the ability to select one bit of data from a selected one of the RAM devices 22, 24, 26, 28, 30, 32, 34, 36 according to the address bits A0:A2 that are applied to select inputs of the bit write buffer 66.

A byte read buffer 68 is employed to interface the microprocessor 12 with the memory array 20. The byte read buffer 68 may be of the identical integrated circuit type as employed for the bit write buffer 62 and the byte write buffer 64. The A13 address bit is applied to the E1 enable input of the byte read buffer 68 for the byte data mode of operation.

Enable signals are provided to the line decoder device 60 and buffers 62, 64, 66, 68 from the microprocessor 12 via a gating circuit including a plurality of dual inverted-input NAND gates 70, 72, 74, 76, 78. The control signal $\overline{RAM}$ is applied to an input of both the dual inverted-input NAND gates 70, 72. The control signal $R/\overline{W}$ is applied to the other input of the dual inverted-input NAND gate 70. The control signal $R/\overline{W}$ is applied to the other input of the dual inverted-input NAND gate 72. The output of the dual inverted-input NAND gate 72 is applied to the E1 enable input of both the bit write buffer 62 and the byte write buffer 64. The output of the dual inverted-input NAND gate 70 is applied to the E2 enable input of the byte read buffer 68. The output of gate 70 and the $\overline{A13}$ address bit are separately applied to the inputs of the dual inverted-input NAND gate 74. The output of the dual inverted-input NAND gate 74 is applied to an input of both the dual inverted-input NAND gates 76, 78. An $\overline{A12}$ address bit is applied to the second input of the dual inverted-input NAND gate 76. The A12 address bit is applied to the second input of the dual inverted-input NAND gate 78.

A 3-state buffer gate 80, such as an integrated circuit device sold by Motorola, Inc. under the part number SN74LS125A and described in the Motorola Schottky TTL Data Book is coupled to receive the output of the bit read buffer 66. The inverted output of the bit read buffer 66 is coupled to a 3-state buffer gate 82 that may be the same type as gate 80. The 3-state buffers 80, 82 include an inverted input that enables corresponding data output as data input when a low signal is applied to the inverted input. For a high signal input to the inverted input of gates 80, 82 a high impedance (off) output is provided for either a high or low data input to the buffer gates 80, 82. The output of the dual inverted-input NAND gate 76 is applied to the inverted input of buffer gate 82. The output of the gate 78 is applied to the inverted input of buffer gate 80.

An exclusive OR gate 84 is coupled to the address bus 16 and to the data bus 14. The A12 address bit is applied to an input of the exclusive OR 84 via the address bus 16. The D7 data bit is applied to the second input of exclusive OR 84. The output of the exclusive OR 84 is applied to the input of the bit write buffer 62, as shown.

The operation of the microprocessor control system 10 may be understood as follows. First considering the bit read mode of operation of the control system 10, a single bit in the memory array 20 is selected and presented to the microprocessor data bus 14 in a selected data bit position, for example, D7. In the bit read mode of operation, inverted data may be selected via the memory addressing. The address lines A0:A13 are provided with a predetermined format for the bit read mode of operation as follows. The A13 address bit is set to select the bit mode. The A12 address bit is set for inverted data or reset for true data, as desired. The address bits A3:A11 provide the address of the byte in the external memory array 20 which contains the desired data bit. The A0:A2 address bits provide the address of the data bit within the addressed byte. The sequence of the operation in the bit read mode is as follows. The microprocessor 12 presents the address A0:A13 to the external memory array 20. The microprocessor 12 provides control signals E, Q, $R/\overline{W}$ and $\overline{RAM}$ to the memory array 20 via the control bus 18. The E and Q control signals are provided to synchronize the memory array 20 to the microprocessor 12. The $R/\overline{W}$ control signal is HIGH for the read mode and the $\overline{RAM}$ control signal selects the bit/byte memory array 20. The A0:A2 address bits are decoded by the line decoder 60 to select a desired one of RAM devices 22, 24, 26, 28, 30, 32, 34, 36 that contains the desired data bit. The selected one of RAM devices 22, 24, 26, 28, 30, 32, 34, 36 presents the desired data bit on the data output D0 line. The desired data bit is presented to the microprocessor data bus as data bit D7 via multiplexer 66 and the selected one of buffers 80, 82. The A12 address bit from the microprocessor 12 is employed to enable one of the buffers 80, 82 to provide true or inverted data, as desired.

In the bit write mode of operation of the microprocessor control system 10, a data bit from the microprocessor 12 is presented to a selected RAM device 22, 24, 26, 28, 30, 32, 34, 36 of the memory array 20 via the data bus 14. The data bit received from the microprocessor data bus 14 is inverted by the exclusive OR gate 84 when the A12 address bit is set for inverted data. In the bit write mode of operation, the address lines A0:A13 are set as follows. The A13 address bit is selected for the bit mode, the A12 address bit is set for inverted data or reset for true data as is desired, the A3:A11 address bits provide the address of the byte in the memory array 20 to store the data bit from the microprocessor 12 and the A0:A2 address bits provide the address of the data bit within the addressed byte. The sequence of the bit write mode of operation is as follows. The microprocessor 12 presents the address bits A3:A11 to the memory array 20 address bus 16 and data bit D7 to the memory array 20 via the data bus 14. The R/W control signal is provided low for the write mode. The data bit D7 is presented to the exclusive OR gate 84 which inverts the data bit D7 when A12 address bit is HIGH. The exclusive OR gate 84 applies the data bit to bit write buffer 62 which applies the data bit to all the RAM devices 22–36 on the data input DI line. The data bit is presented to a selected one of the RAM devices 22–36 that is selected by decoder 60. The data bit is written into the selected RAM device according to the A3:A11 address bits that are provided to the RAM devices 22, 24, 26, 28, 30, 32, 34, 36.

In the byte read and byte write modes of operation of the microprocessor control system 10, the microprocessor 12 addresses data bytes in the external memory array 20. In the byte read and byte write modes of operation the inverted data feature is not provided. The A0:A13 address lines are set as follows for the byte read and byte write modes of operation. The A13 address bit is reset for byte mode, the A12 address bit is not used, the A3:A11 address bytes provide the address of the desired bytes and the A0:A2 address bits are not used. The sequence of operation may be understood as follows. The microprocessor 12 presents the address A3:A11 to the external memory array 20. The E and Q control signals are provided to synchronize the memory array 20 to the microprocessor 12. The R/W is provided HIGH for the read mode and LOW for the write mode. The RAM signal selects the external memory array 20. In the read mode the desired data is presented to the microprocessor data bus 14 via the byte read buffer 68. In the write mode of operation, data from the microprocessor 12 is written into the proper location in the memory array 20. The data is provided from the microprocessor 12 to the memory array 20 via the microprocessor data bus 14 and the byte write buffer 64.

In summary, an improved control system has been described that includes an external memory array to enable the microprocessor to selectively manipulate bytes or individual bits of data whereby both execution time and program size are reduced.

Obviously, modifications and variations in the present invention are possible in light of the above teachings. Thus, it is to be understood that, within the scope of the appended claims, the invention may be practiced otherwise than as specifically described hereinabove.

What is claimed and desired to be secured by Letters Patent is:

1. A microprocessor system including a microprocessor providing a plurality of control signals and a plurality of address signals, said system comprising:
   an external memory array including a plurality of uniquely addressable memory means, each of said memory means having a plurality of directly addressable data storage locations;
   control means being responsive to said microprocessor control signals for selecting said external memory array and for synchronizing said external memory array to the microprocessor and for controlling the transfer of data between said external memory array and the microprocessor; and
   addressing means being responsive to said microprocessor address signals for selecting a predetermined one of said uniquely addressable memory means and for selecting a predetermined addressable data storage location within said addressing means, said addressing means including means for identifying a data bit mode and a data byte mode whereby the microprocessor is enabled to selectively manipulate bytes or individual bits of data.

2. A microprocessor system as claimed in claim 1 wherein said plurality of uniquely addressable memory means comprises a plurality of random access memories.

3. A microprocessor system as claimed in claim 1 wherein said addressing means further includes means for selecting inverted data in said data bit mode.

4. A microprocessor system as claimed in claim 1 wherein said addressing means provide addresses comprising a predetermined coded format including byte address information, bit address information, data bit and byte mode information, and inverted data information.

5. A microprocessor system as claimed in claim 1 further comprising means for transferring individual data bits between said memory array and the microprocessor on a predetermined data line.

6. A microprocessor system including a microprocessor having a plurality of bidirectional data terminals for receiving and sending data signals, a plurality of control terminals for sending control signals and a plurality of address terminals for sending address signals, said system comprising in combination:
   an external memory array including a plurality of uniquely addressable memory means, each of said memory means having a plurality of directly addressable storage locations, said plurality of uniquely addressable memory means being connected to said microprocessor address terminals for receiving said microprocessor address signals;
   control means connected to said external memory array and connected to said microprocessor control terminals for receiving said microprocessor control signals and connected to said microprocessor address terminals for receiving said microprocessor address signals, for enabling said external memory array and for synchronizing said external memory array to said microprocessor, said control means including means for selecting a predetermined one of said uniquely addressable memory means responsive to a first predetermined one of said microprocessor address signals, said control means including means for identifying a data bit mode and a data byte mode responsive to a second predetermined one of said microprocessor address signals;

first buffer means connected to said external memory array and connected to said microprocessor bidirectional data terminals for transferring data bytes between said microprocessor and said external memory array; and second buffer means connected to said external memory array and connected to said microprocessor bidirectional data terminals for transferring data bits between said external memory array and said microprocessor.

7. A microprocessor system as claimed in claim 6 wherein said plurality of uniquely addressable memory means comprises a plurality of random access memories.

8. A microprocessor system as claimed in claim 6 wherein said control means further includes means for selecting inverted data in said data bit mode responsive to a third predetermined one of said microprocessor address signals.

* * * * *